(12) United States Patent
Lee et al.

(10) Patent No.: US 8,164,416 B2
(45) Date of Patent: Apr. 24, 2012

(54) PROGRAMMABLE SELECTIVE WAKE-UP FOR RADIO FREQUENCY TRANSPONDER

(75) Inventors: Thomas Youbok Lee, Chandler, AZ (US); James B. Nolan, Chandler, AZ (US); Steve Vernier, Phoenix, AZ (US); Randy Yach, Phoenix, AZ (US); Alan Lamphier, Elk Rapids, MI (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 12/490,545

(22) Filed: Jun. 24, 2009

(65) Prior Publication Data

US 2009/0256674 A1 Oct. 15, 2009

Related U.S. Application Data

(63) Continuation of application No. 11/079,878, filed on Mar. 14, 2005, now abandoned.

(60) Provisional application No. 60/564,829, filed on Apr. 23, 2004.

(51) Int. Cl.
*G05B 19/00* (2006.01)

(52) U.S. Cl. ........................................................ 340/5.6

(58) Field of Classification Search ............... 340/10.1, 340/10.2, 10.3, 10.33, 10.34, 825, 5.61, 5.62, 340/5.63, 5.64, 5.7, 5.71, 5.72
See application file for complete search history.

(56) References Cited

U.S. PATENT DOCUMENTS

| | | | |
|---|---|---|---|
| 5,471,212 A | 11/1995 | Sharpe et al. | 342/51 |
| 5,686,920 A | 11/1997 | Hurta et al. | 342/42 |
| 5,838,257 A | 11/1998 | Lambropoulos | 340/825.54 |
| 6,509,825 B1 | 1/2003 | Smit et al. | 340/5.2 |
| 6,664,899 B1 | 12/2003 | Tsuchihashi | 340/825.69 |
| 7,102,488 B2 | 9/2006 | Friedrich | 340/10.2 |
| 2001/0010491 A1 | 8/2001 | Marneweck et al. | 340/10.33 |
| 2001/0041551 A1 | 11/2001 | Rotzoll | 455/343 |
| 2002/0055345 A1 | 5/2002 | Wood, Jr. | 455/277.1 |

FOREIGN PATENT DOCUMENTS

| | | |
|---|---|---|
| EP | 1087522 | 9/2000 |
| WO | 0241650 | 5/2002 |

OTHER PUBLICATIONS

TIRIS Automotive Devices, Analog Front End IC TMS37122 Reference Guide, Aug. 2001.*

PCT International Search Report with Written Opinion, PCT/US2005/012781, 12 pages, Mailing Date Jul. 29, 2005.

(Continued)

*Primary Examiner* — Nabil Syed
(74) *Attorney, Agent, or Firm* — King & Spalding L.L.P.

(57) ABSTRACT

A remote keyless entry (RKE) transponder has a programmable selective wake-up filter for determining whether the RKE transponder should wake-up to process a received signal. The wake-up filter correlates the timing of an input signal's carrier amplitude on and off time periods to a predefined programmable time period profile for a desired signal which has a certain carrier on time (time period on) and a certain carrier off time (time period off) arranged into a coded "header." When a received signal matches the predefined time period profile, then the RKE transponder will wake-up to process the incoming signal data. The predefined time period profile may be programmable and may be stored in a header configuration register. Each RKE transponder has unique predefined time period on and time period off profiles.

34 Claims, 12 Drawing Sheets

OTHER PUBLICATIONS

Chinese Office Action for 2005800185149, Dec. 15, 2008.
Texas Instruments Incorporated, Three-Channel LF Transceiver (3D AFE) TMS37122; Texas Instruments Radio Frequency Identification Systems (http://www.ti-rfid.com), 2001.

Atmel Corporation, Ultra Low Power 125 kHz 3D—Wake-up Receiver with RSSI, ATA5282 [Preliminary], ATMEL, pp. 1-22 (www.atmel.com/literature) Feb. 2005.

* cited by examiner

| Bit Setting of Configuration Register 0 | | Wake-up Filter Timing (Output Enable Filter) | | |
|---|---|---|---|---|
| Bits (8:7) | Bits (6:5) | | | |
| W<sub>AKH</sub> | W<sub>AKL</sub> | T<sub>WAKH</sub> (ms) | T<sub>WAKL</sub> (ms) | T<sub>WAKT</sub> (ms) |
| 01 | 00 | 1 | 1 | 3 |
| 01 | 01 | 1 | 1 | 3 |
| 01 | 10 | 1 | 2 | 4 |
| 01 | 11 | 1 | 4 | 6 |
| 10 | 00 | 2 | 1 | 4 |
| 10 | 01 | 2 | 1 | 4 |
| 10 | 10 | 2 | 2 | 5 |
| 10 | 11 | 2 | 4 | 8 |
| 11 | 00 | 4 | 1 | 6 |
| 11 | 01 | 4 | 1 | 6 |
| 11 | 10 | 4 | 2 | 8 |
| 11 | 11 | 4 | 4 | 10 |
| 00 | XX | Filter Disabled | | |

*Figure 7*

| | Bit 8 | Bit 7 | Bit 6 | Bit 5 | Bit 4 | Bit 3 | Bit 2 | Bit 1 | Bit 0 |
|---|---|---|---|---|---|---|---|---|---|
| Reg.0 | WakH | | WakL | | ALRTIND | LCZen | LCYen | LCXen | Parity |
| Reg.1 | CLK DIV | Data Out | LCX Tuning Capacitor | | | | | | Parity |
| Reg.2 | | | LCY Tuning Capacitor | | | | | | Parity |
| Reg.3 | | | LCZ Tuning Capacitor | | | | | | Parity |
| Reg.4 | LCX Sensitivity | | | | LCY Sensitivity | | | | Parity |
| Reg.5 | | MOD En/Dis | Min Modulation | | LCZ Sensitivity | | | | Parity |
| Reg.6 | Column Parity Register | | | | | | | | Parity |
| Reg.7 | Status Register | | | | | | | | Parity |

| Command | Address | Data | Row Parity | Description |
|---|---|---|---|---|
| | Command only – Address and DATA are "Don't Care," but need to be clocked in regardless. | | | |
| 000 | XXXX | XXXX XXXX | X | Clamp on – enable modulation circuit |
| 001 | XXXX | XXXX XXXX | X | Clamp off – disable modulation circuit |
| 010 | XXXX | XXXX XXXX | X | Enter Sleep mode (any other command wakes the device) |
| 011 | XXXX | XXXX XXXX | X | AGC Preserve On – to temporarily preserve the current AGC level |
| 100 | XXXX | XXXX XXXX | X | AGC Preserve Off – AGC again tracks strongest input signal |
| 101 | XXXX | XXXX XXXX | X | Soft Reset – resets various circuit blocks |
| | Read Command – Data will be read from the specified register address. | | | |
| 110 | 0000 | Config Byte 0 | P | General – options that may change during normal operations |
| | 0001 | Config Byte 1 | P | LCX antenna tuning and LFDATA output format |
| | 0010 | Config Byte 2 | P | LCY antenna tuning |
| | 0011 | Config Byte 3 | P | LCZ antenna tuning |
| | 0100 | Config Byte 4 | P | LCX and LCY sensitivity reduction |
| | 0101 | Config Byte 5 | P | LCZ sensitivity reduction and modulation depth |
| | 0110 | Column Parity | P | Column parity byte for Config Byte 0 -> Config Byte 5 |
| | 0111 | Device Status | X | Device status – parity error; which input is active, etc. |
| | Write command – Data will be written to the specified register address. | | | |
| 111 | 0000 | Config Byte 0 | P | General – options that may change during normal operation |
| | 0001 | Config Byte 1 | P | LCX antenna tuning and LFDATA output format |
| | 0010 | Config Byte 2 | P | LCY antenna tuning |
| | 0011 | Config Byte 3 | P | LCZ antenna tuning |
| | 0100 | Config Byte 4 | P | LCX and LCY sensitivity reduction |
| | 0101 | Config Byte 5 | P | LCZ sensitivity reduction and modulation depth |
| | 0110 | Column Parity | P | Column parity byte for Config Byte 0 -> Config Byte 5 |
| | 0111 | Not Used | X | Register is readable, but not writable |
| | Note: "P" denotes the row parity bit (odd parity) for the respective data byte. | | | |

*Figure 14*

PROGRAMMABLE SELECTIVE WAKE-UP FOR RADIO FREQUENCY TRANSPONDER

RELATED PATENT APPLICATION

This application is a continuation of and claims priority to commonly owned U.S. patent application Ser. No. 11/079,878; filed Mar. 14, 2005 now abandoned; entitled "Programmable Selective Wake-Up for Radio Frequency Transponder," by Thomas Youbok Lee, James B. Nolan, Steve Vernier, Randy Yach and Alan Lamphier; and U.S. Provisional Patent Application Ser. No. 60/564,829; filed Apr. 23, 2004; entitled "Programmable Wake-Up Filter for Radio Frequency Transponder," by Thomas Youbok Lee, James B. Nolan, Steve Vernier, Randy Yach and Alan Lamphier, all of which are hereby incorporated by reference herein for all purposes.

This application is related to commonly owned U.S. patent application Ser. No. 11/079,765; filed Mar. 14, 2005; entitled "Reducing False Wake-Up in a Low Frequency Transponder," by James B. Nolan, Thomas Youbok Lee, Alan Lamphier, Ruan Lourens and Steve Vernier; U.S. patent application Ser. No. 11/079,787; filed Mar. 14, 2005; entitled "Noise Alarm Timer Function for Three-Axis Low Frequency Transponder," by James B. Nolan, Thomas Youbok Lee, Steve Vernier and Alan Lamphier; and U.S. patent application Ser. No. 11/079,719; filed Mar. 14, 2005; entitled "Dynamic Configuration of a Radio Frequency Transponder," by Thomas Youbok Lee, James B. Nolan, Steve Vernier, Ruan Lourens, Vivien Delport, Alan Lamphier and Glen Allen Sullivan; all of which are hereby incorporated by reference herein for all purposes.

FIELD OF THE INVENTION

The present invention relates generally to inductively coupled magnetic field transmission and detection systems, such as remote keyless entry (RKE) and passive keyless entry (PKE) systems, and more particularly to an apparatus and method for reducing false wake-up in such systems.

BACKGROUND OF THE INVENTION TECHNOLOGY

In recent years, the use of remote keyless entry (RKE) systems for automotive and security applications have increased significantly. The conventional remote keyless entry (RKE) system consists of a RKE transmitter and a base station. The RKE transmitter has activation buttons. When an activation button is pressed, the RKE transmitter transmits a corresponding radio frequency data to the base station. The base station receives the data and performs appropriate actions such as unlock/lock car doors or trunks if the received data is valid. In the conventional RKE systems, the data is transmitted from the RKE transmitter to the base station, but not from the base station to the transmitter. This is often called unidirectional communication.

Much more sophisticated RKE systems can be made by using a bidirectional communication method. The bidirectional remote keyless entry system consists of a transponder and a base station. The transponder and base station can communicate by themselves without human interface buttons. The base station sends a command to the transponder and the transponder can respond to the base station accordingly if the command is valid. By utilizing the bidirectional communication method, one can unlock/lock his/her car doors or trunks remotely without pressing any buttons. Therefore, a fully hands-free access to the room or car is now possible.

The bidirectional communication RKE system consists of base station and transponder. The base station can send and receive low frequency command/data, and also can receive VHF/UHF/Microwave signals. The transponder can detect the low frequency (LF) data and transmit data to the base station via low frequency or VHF/UHF/Microwave. In applications, the bidirectional transponder may have the activation buttons as optional, but can be used without any activation button, for example, to unlock/lock car doors, trunks, etc.

For a reliable hands-free operation of the transponder that can operate without human interface, the transponder must be intelligent enough on decision making for detecting input signals correctly and managing its operating power properly for longer battery life. The idea in this application describes the dynamic configuration of the transponder, that can reconfigure the transponder's feature sets any time during applications, to communicate with the base station intelligently by itself in the hand-free operation environment.

Referring to FIG. 1, depicted is a prior art passive remote keyless entry (RKE) system. These wireless RKE systems typically are comprised of a base station 102, which is normally placed in the vehicle in automobile applications, or in the home or office in security entrance applications, and one or more RKE transponders 104, e.g., key-fobs, that communicate with the base station 102. The base station 102 may comprise a radio frequency receiver 106, antenna 110 and, optionally, a low frequency transmitter/reader 108 and associated antenna 112. The transponder 104 may comprise a radio frequency transmitter 122, an encoder 124 coupled to the transmitter 122, antenna 118 and, optionally, a low frequency transponder 126 and associated antenna 120. The transmitter 122 may communicate with the receiver 106 by using very high frequency (VHF) or ultra high frequency (UHF) radio signals 114 at distances up to about 100 meters so as to locate a vehicle (not shown) containing the base station 102, locking and locking doors of the vehicle, setting an alarm in the vehicle, etc. The encoder 124 may be used to encrypt the desired action for only the intended vehicle. Optionally, the low frequency transponder 126 may be used for hands-free locking and unlocking doors of a vehicle or building at close range, e.g., 1.5 meters or less over a magnetic field 116 that couples between the coils 112 and 120.

The RKE transponder 104 is typically housed in a small, easily carried key-fob (not shown) and the like. A very small internal battery is used to power the electronic circuits of the RKE transponder when in use. The duty cycle of the RKE transponder must, by necessity, be very low otherwise the small internal battery would be quickly drained. Therefore to conserve battery life, the RKE transponder 104 spends most of the time in a "sleep mode," only being awakened when a sufficiently strong magnetic field interrogation signal is detected. The RKE transponder will awaken when in a strong enough magnetic field at the expected operating frequency, and will respond only after being thus awakened and receiving a correct security code from the base station interrogator, or if a manually initiated "unlock" signal is requested by the user (e.g., unlock push button on key-fob).

This type of RKE system is prone to false wake-up, short battery life, unreliable operating range that is too dependant upon orientation of the key fob (not shown). Thus, it is necessary that the number of false "wake-ups" of the RKE transponder circuits be keep to a minimum. This is accomplished by using low frequency time varying magnetic fields to limit the interrogation range of the base station to the RKE transponder. The flux density of the magnetic field is known as "field intensity" and is what the magnetic sensor senses. The field intensity decreases as the cube of the distance from the source, i.e., $1/d^3$. Therefore, the effective interrogation range of the magnetic field drops off quickly. Thus, walking through a shopping mall parking lot will not cause a RKE transponder to be constantly awakened. The RKE transponder will thereby be awakened only when within close proximity to the correct vehicle. The proximity distance necessary to wake up the RKE transponder is called the "read range." The VHF or UHF response transmission from the RKE transponder to the base station interrogator is effective at a much greater distance and at a lower transmission power level.

When magnetic flux lines cut a coil of wire, an electric current is generated, i.e., see Maxwell's Equations for current flow in an electric conductor being cut by a magnetic field flux. Therefore the detected magnetic flux density will be proportional to the amount of current flowing in the pick-up coil.

In a closely coupled or near field noisy environment, however, a noise source, e.g., magnetic or electromagnetic, could cause the analog front-end and associated external control device to "wake-up" or remain "awake" and thus cause increased power consumption and thereby reduce battery life. An effective way of conserving battery power is to turn off, e.g., disconnect or put into a "sleep mode" the electronic circuits of the RKE device and any associated circuitry not required in detecting the presence of an electromagnetic RF signal (interrogation challenge) from the keyless entry system reader. Only when the interrogation signal is detected, are the electronic circuits of the RKE device reconnected to the battery power source (wake-up). A problem exists, however, when the transponder receiver is exposed to noise sources such as electromagnetic radiation (EMR) emanating from, for example, televisions and computer monitors having substantially the same frequency as the interrogation signal, the RKE device will wake-up unnecessarily. If the RKE transponder receiver is exposed to a continuous noise source, the battery may be depleted within a few days.

Therefore, there is a need for preventing or substantially reducing false "wake-up" of the RKE transponder.

SUMMARY OF THE INVENTION

The present invention overcomes the above-identified problems as well as other shortcomings and deficiencies of existing technologies by providing an apparatus, system and method for reducing false "wake-up" of a remote keyless entry (RKE) transponder, thereby decreasing wasted power consumption and increasing battery operating time.

In an exemplary embodiment, according to the present invention, a RKE transponder comprises an analog front-end (AFE) having a programmable wake-up filter. The programmable wake-up filter correlates the timing of an input signal's carrier amplitude on and off pulse time periods to a predefined programmable pulse time period profile for a desired signal. The desired signal will have a certain carrier on time (pulse time period on) and a certain carrier off time (pulse time period off) arranged into a coded "header" at the beginning of the incoming signal. When a received signal's carrier on and off time periods substantially match the predefined pulse time period profile of a desired signal, then the RKE transponder will wake-up to process the incoming signal data. The predefined pulse time period profile may be programmable and may be stored in a header configuration register of the RKE transponder. A predefined pulse time period profile may be unique for each of a plurality of RKE transponders so that only the desired one of the plurality of RKE transponders will wake-up for the received signal.

A predefined pulse time period profile may be for example: (a) when a signal carrier is detected there will be at least 4 milliseconds of fixed settling time for automatic gain control (AGC) stabilization (settling time), (b) a short no signal carrier time period of less than 200 microseconds, (c) a signal carrier having a first time period, (d) no signal carrier (gap) having a second time period, and (e) start of data transmission on the desired signal and decoding of the data by the RKE system that has been awakened by the programmable wake-up filter. The timing requirements of the first time period and the second time period may be programmable, stored in a configuration register and may be reprogrammed via a SPI interface from an external control device, e.g., a digital processor, microprocessor, microcontroller, digital signal processor (DSP), application specific integrated circuit (ASIC), programmable logic array (PLA) and the like, of the RKE transponder.

For multiple RKE transponder applications, each transponder may be programmed with different combinations of first and second time periods so that only the intended (incoming signal header matches the first time and the second time periods stored in the configuration register of the intended RKE transponder) will wake-up, the other transponders will remain in a low power sleep condition. The base station thereby may send a sequence of messages, each with a different header, so that each transponder will respond to the base station one by one as the intended transponder receives its matching header. This is advantageous for avoiding transmission collisions (multiple transponders responding at the same time). Since a transponder is only awakened when an input signal header matches the predefined programmable pulse time period profile of the transponder. The wake-up filter may be disabled for testing and calibration purposes of the RKE transponder.

In another exemplary embodiment, a programmable wake-up filter for a multi-channel, e.g., three channels: X, Y and Z, low frequency (LF) RKE transponder may be utilized to correlate timing of an input signal's carrier amplitude on and off pulse time periods to a predefined programmable pulse time period profile for a desired signal. The desired signal will have a certain carrier on time (pulse time period on) and a certain carrier off time (pulse time period off) arranged into a coded "header" at the beginning of the incoming signal. When a received signal's carrier on and off time periods substantially match the predefined pulse time period profile of a desired signal, then the LF RKE transponder will wake-up to process the incoming signal data. The predefined pulse time period profile may be programmable and may be stored in a header configuration register of the LF RKE transponder. A predefined pulse time period profile may be unique for each of a plurality of LF RKE transponders. The LF RKE transponder may operate at frequencies from about 100 kHz to about 400 kHz.

The programmable wake-up filter looks for two pulses having defined time periods. The first pulse includes a carrier on time period counter for example of 64 radio frequency (RF) cycles (approximately 0.5 millisecond) and an AGC settling time of, for example, approximately 3 milliseconds, followed by a carrier off time period (gap) of, for example, approximately 200 microseconds. Next the programmable wake-up timer looks for a second pulse duration (high and low time periods) which match the predefined programmable pulse time period profile stored in the configuration register. The values of the second pulse high ($T_{WAK}H$) and low time ($T_{WAK}L$) periods are programmable and may be configured for specific transponders and base stations. Thus, unwanted signals will not wake-up the RKE transponder. Other time periods are also adaptable to the present invention and are contemplated herein.

A technical advantage of the present invention is substantially eliminating false wake-up from unwanted signals and noise that unnecessarily uses power and thus reduces battery life. Another technical advantage is using a unique input signal pulse time period header for each transponder so as to avoid response collisions from multiple transponders. Still another technical advantage is reprogramming the wake-up filter parameters via a simple SPI command. Yet another technical advantage is the wake-up filter may be disabled for testing and calibration purposes. Other technical advantages should be apparent to one of ordinary skill in the art in view of what has been disclosed herein.

BRIEF DESCRIPTION OF THE DRAWINGS

A more complete understanding of the present disclosure and advantages thereof may be acquired by referring to the following description taken in conjunction with the accompanying drawings wherein:

FIG. 7 is a table showing exemplary wake-up filter timing parameter selections;

FIG. 14 is an exemplary table of SPI commands to the AFE transponder circuits and configuration registers thereof.

Figure 1:
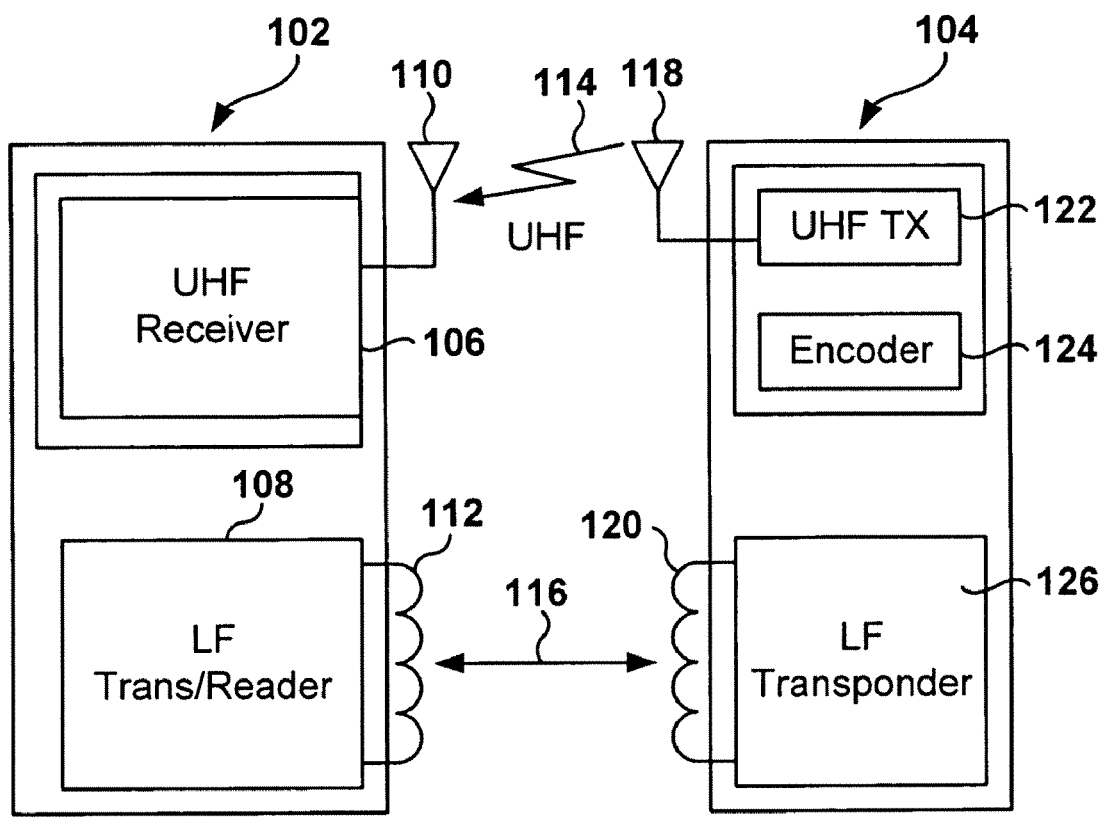
FIG. 1 is a schematic block diagram of a prior art remote keyless entry system.

The present invention may be susceptible to various modifications and alternative forms. Specific embodiments of the present invention are shown by way of example in the drawings and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

Referring now to the drawings, the details of exemplary embodiments of the present invention are schematically illustrated. Like elements in the drawing will be represented by like numbers, and similar elements will be represented by like numbers with a different lower case letter suffix.

Figure 2:
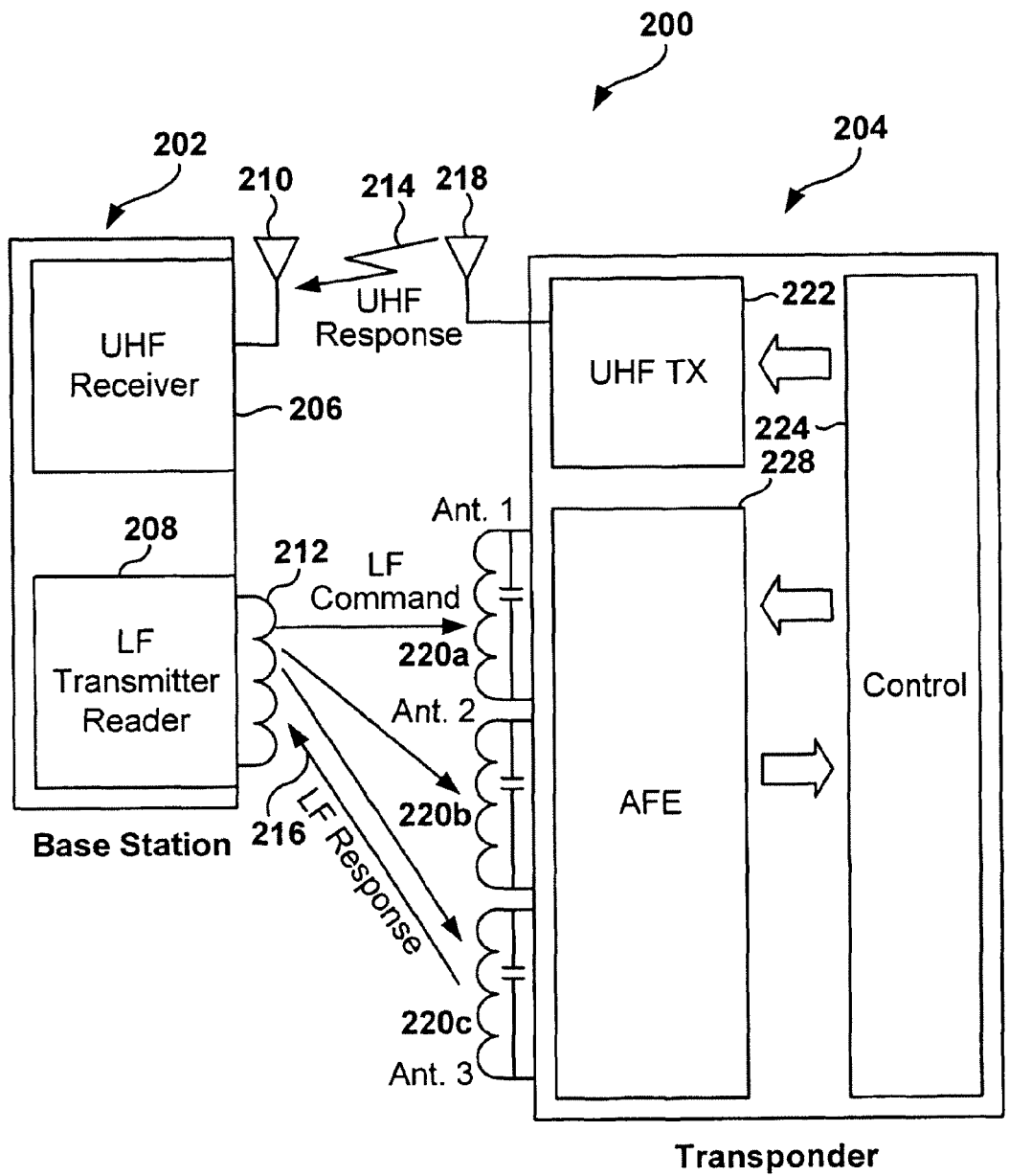
FIG. 2 is a schematic block diagram of an exemplary embodiment of a remote keyless entry system, according to the present invention.

Referring to FIG. 2, depicted is a schematic block diagram of an exemplary embodiment of a remote keyless entry (RKE) system, according to the present invention. The RKE system, generally represented by the numeral 200, comprises a base station 202, which is normally placed in the vehicle in automobile applications, or in the home or office in security entrance applications, and one or more RKE transponders 204, e.g., key-fobs, that communicate with the base station 202. The base station 202 may comprise a radio frequency receiver 206, antenna 210, and a low frequency transmitter/reader 208 and associated antenna 212. The transponder 204 may comprise a radio frequency transmitter 222, antenna 218, a low frequency analog front-end (AFE) 228, low frequency antennas 220a, 220b and 220c, and an external control device 224 coupled to the transmitter 222 and AFE 228.

The transmitter 222 may communicate with the receiver 206 by using very high frequency (VHF) or ultra high frequency (UHF) radio signals 214 at distances up to about 100 meters so as to locate a vehicle (not shown) containing the base station 202, locking and unlocking doors of the vehicle, setting an alarm in the vehicle, etc. The external control device 224, e.g., a digital processor, microprocessor, microcontroller, digital signal processor (DSP), application specific integrated circuit (ASIC), programmable logic array (PLA) and the like, may encrypt the transmitting data to the base station. The low frequency AFE 228 may be used for hands-free locking and unlocking doors of a vehicle or building at close range, e.g., 1.5 meters or less over a magnetic field 216 that couples between coil 212, and coils 220a, 220b and/or 220c.

The RKE transponder 204 is typically housed in a small, easily carried key-fob (not shown) and the like. A very small internal battery may be used to power the electronic circuits of the RKE transponder 204 when in use (wake-up condition). The turn-on time (active time) of the RKE transponder 204 must, by necessity, be very short otherwise the small internal battery would be quickly drained. Therefore to conserve battery life, the RKE transponder 204 spends most of the time in a "sleep mode," only being awakened when a sufficiently strong magnetic field interrogation signal having a correct wake-up filter pattern is detected or an action button is pressed. The RKE transponder 204 will awaken when in the strong enough magnetic field 216 (above a sensitivity level), and with a correct wake-up filter pattern that matches the programmed values in the configuration register. Then the RKE transponder 204 will respond only after being thus awakened and receiving a correct command code from the base station interrogator, or if a manually initiated "unlock" signal is requested by the user (e.g., unlock push button on key-fob).

The base station 202 acts as an interrogator sending a command signal within a magnetic field 216, which can be identified by a RKE transponder 204. The RKE transponder 204 acts as a responder in two different ways: (1) the RKE transponder 204 sends its code to the base station 202 by UHF transmitter 222, or (2) the LF talk-back by clamping and unclamping of the LC antenna voltage. The base station 202 generates a time varying magnetic field at a certain frequency, e.g., 125 kHz. When the RKE transponder 204 is within a sufficiently strong enough magnetic field 216 generated by the base station 202, the RKE transponder 204 will respond if it recognizes its code, and if the base station 202 receives a correct response (data) from the RKE transponder 204, the door will unlock or perform predefined actions, e.g., turn on lights, control actuators, etc. Thus, the RKE transponder 204 is adapted to sense in a magnetic field 216, a time varying amplitude magnetically coupled signal at a certain frequency. The magnetically coupled signal carries coded information (amplitude modulation of the magnetic field), which if the coded information matches what the RKE transponder 204 is expecting, will cause the RKE transponder 204 to communicate back to the base station via the low frequency (LF) magnetic field 216, or via UHF radio link.

The flux density of the magnetic field is known as "magnetic field intensity" and is what the magnetic sensor (e.g., LC resonant antenna) senses. The field intensity decreases as the cube of the distance from the source, i.e., $1/d^3$. Therefore, the effective interrogation range of the magnetic field drops off quickly. Thus, walking through a shopping mall parking lot will not cause a RKE transponder to be constantly awakened. The RKE transponder will thereby be awakened only when within close proximity to the correct vehicle. The proximity distance necessary to wake up the RKE transponder is called the "read range." The VHF or UHF response transmission from the RKE transponder to the base station interrogator is effective at a much greater distance and at a lower transmission power level.

The read range is critical to acceptable operation of a RKE system and is normally the limiting factor in the distance at which the RKE transponder will awaken and decode the time varying magnetic field interrogation signal. It is desirable to have as long of a read range as possible. A longer read range may be obtained by developing the highest voltage possible on any one or more of the antenna (220a, 220b and/or 220c). Maximum coil voltage is obtained when the base station coil 212 and any RKE transponder coil 220 are placed face to face, i.e., maximum magnetic coupling between them. Since the position of the RKE transponder 204 can be random, the chance of having a transponder coil 220 face to face with the base station coil 212 is not very good if the transponder 204 has only one coil 220 (only one best magnetic coil orientation). Therefore, exemplary specific embodiments of the present invention use three antennas (e.g., 220a, 220b and 220c) with the RKE transponder 204. These three antennas 220a, 220b and 220c may be placed in orthogonal directions (e.g., X, Y and Z) during fabrication of the RKE transponder 204. Thus, there is a much better chance that at least one of the three antennas 220a, 220b and 220c will be in substantially a "face-to-face" orientation with the base station coil 212 at any given time. As a result the signal detection range of the RKE transponder 204 is maximized thereby maximizing the read (operating) range of the RKE system 200.

In addition to a minimum distance required for the read range of the RKE key-fob 204, all possible orientations of the RKE key-fob 204 must be functional within this read range since the RKE key-fob 204 may be in any three-dimensional (X, Y, Z) position in relation to the magnetic sending coil 212 of the interrogator base station 208. To facilitate this three-dimensional functionality, X, Y and Z coils 220a, 220b and 220c, respectively, are coupled to the AFE 228, which comprises three channels of electronic amplifiers and associated circuits. Each of the three channels is amplified and coupled to a detector (FIG. 3) which detects the signals received from the X, Y and Z antennas 220a, 220b and 220c, respectively.

Figure 3:
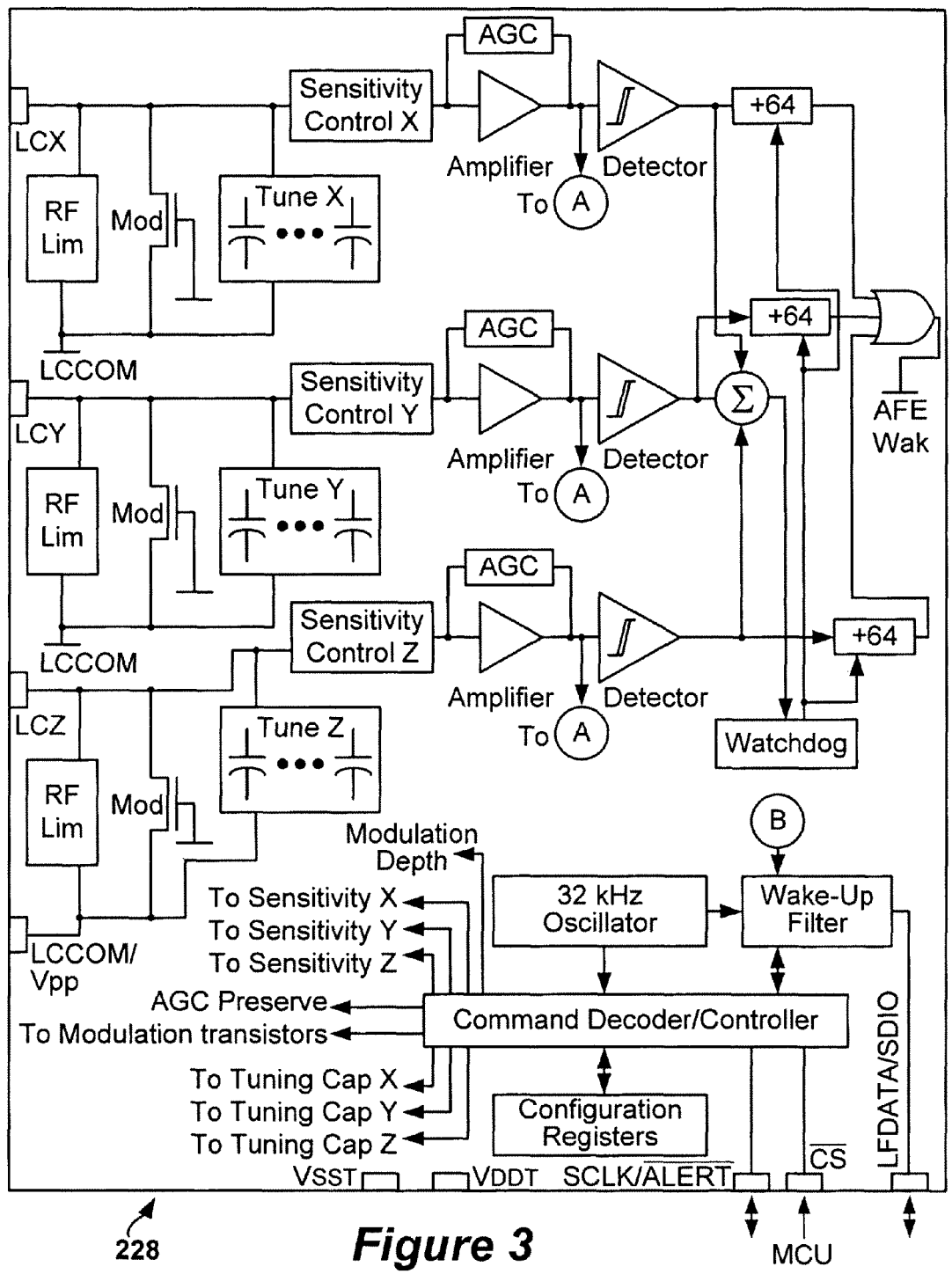
FIG. 3 is a schematic block diagram of the analog front-end (AFE) shown in FIG. 2.

Referring to FIG. 3, depicted is a schematic block diagram of the analog front-end (AFE) 228 shown in FIG. 2. The AFE 228 contains three analog-input channels and comprises amplifiers for these three channels, e.g., X, Y, Z. Each of these channels comprise radio frequency amplitude limiting, antenna tuning, sensitivity control, automatic gain controlled amplifier, and a detector. Each channel has internal tuning capacitance, sensitivity control, an input signal strength limiter, and automatic gain controlled amplifiers. The output of each channel is OR'd and fed into a demodulator. The demodulator output is fed into a wake-up filter, and available at the LFDATA pin if the data matches the programmed wake-up filter pattern. The demodulator contains a signal rectifier, low-pass filter and peak detector.

The detectors are coupled to a summer for combining the outputs of the three detectors. A wake-up filter, configuration registers and a command decoder/controller are also included in the AFE 228. X, Y and Z antennas 220a, 220b and 220c are coupled to the LCX, LCY and LCZ inputs, respectively, and one end of each of these antennas may be coupled to a common pin, LCCOM/Vpp pin.

The AFE 228 in combination with the X, Y and Z antennas 220a, 220b and 220c may be used for three-dimensional signal detection. Typical operating frequencies may be from about 100 kHz to 400 kHz. The AFE 228 may operate on other frequencies and is contemplated herein. Bi-directional non-contact operation for all three channels are contemplated herein. The strongest signal may be tracked and/or the signals received on the X, Y and Z antennas 220a, 220b and 220c may be combined, OR'd. A serial interface may be provided for communications with the external control device 224. Internal trimming capacitance may be used to independently tune each of the X, Y and Z antennas 220a, 220b and 220c. The wake-up filter may be configurable. Each channel has its own amplifier for sensitive signal detection. Each channel may have selectable sensitivity control. Each channel may be independently disabled or enabled. Each detector may have configurable minimum modulation depth requirement control for input signal. Device options may be set through configuration registers and a column parity bit register, e.g., seven 9-bit registers. These registers may be programmed via SPI (Serial Protocol Interface) commands from the external control device 224 (FIG. 2).

The following are signal and pin-out descriptions for the specific exemplary embodiment depicted in FIG. 3. One having ordinary skill in the art of electronics and having the benefit of this disclosure could implement other combinations of signals and pin-outs that would be within the spirit and scope of the present invention.

$V_{DDT}$: AFE positive power supply connection.
$V_{SST}$: AFE ground connection.
LCX: External LC interface pin in the X direction. This pin allows bi-directional communication over a LC resonant circuit.
LCY: External LC interface pin in the Y direction. This pin allows bi-directional communication over a LC resonant circuit.
LCZ: External LC interface pin in the Z direction. This pin allows bi-directional communication over a LC resonant circuit.
LCCOM: Common pin for LCX, LCY and LCZ antenna connection. Also used for test-mode supply input (Vpp).
LFDATA/CCLK/RSSI/SDIO: This is a multi-output pin that may be selected by the configuration register. LFDATA provides the combined digital output from the three demodulators. The SDI is the SPI digital input, when $\overline{CS}$ is pulled low. The SDO is the SPI digital output when performing a SPI read function of register data. RSSI is the receiver signal strength indicator output.
SCLK/$\overline{ALERT}$: SCLK is the digital clock input for SPI communication. If this pin is not being used for SPI ($\overline{CS}$ pin is high) the $\overline{\text{ALERT}}$ open collector output indicates if a parity error occurred or if an ALARM timer time-out occurred.

$\overline{\text{CS}}$: Channel Select pin for SPI communications. The pin input is the SPI chip select-pulled low by the external control device to begin SPI communication, and raised to high to terminate the SPI communication.

Figure 4:
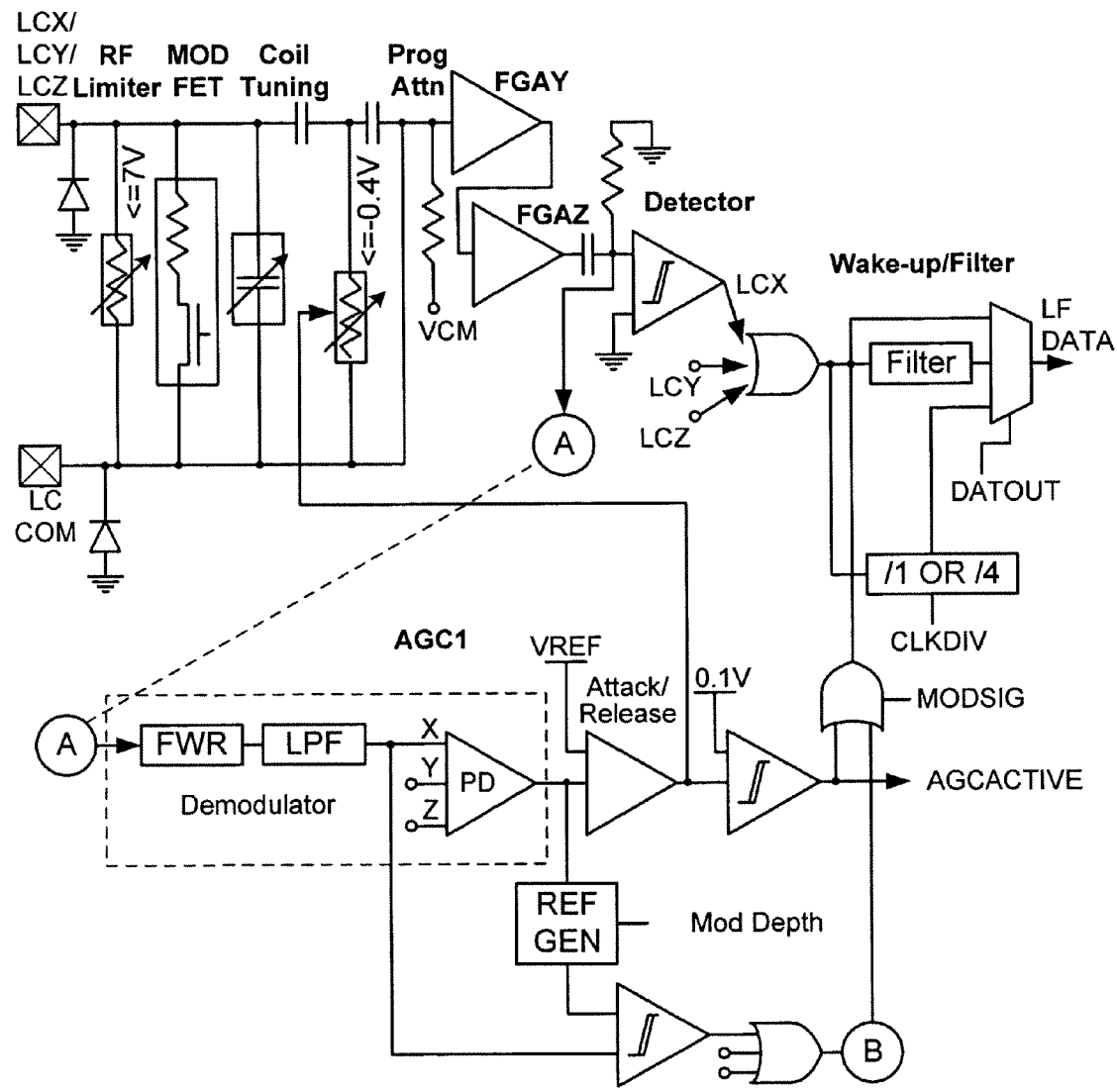
FIG. 4 is a schematic block diagram of a exemplary channel of the three channels, detector, wake-up filter and demodulator shown in FIG. 3.

Referring to FIG. 4, depicted is a schematic block diagram of a exemplary channel of the three channels, detector, wake-up filter and demodulator shown in FIG. 3. The following are functional descriptions for the specific exemplary embodiment depicted in FIG. 4. One having ordinary skill in the art of electronics and having the benefit of this disclosure could implement other combinations of signals and pin-outs that would be within the spirit and scope of the present invention.

RF LIMITER: Limits LC pin input voltage by de-Q'ing the attached LC resonant circuit. The absolute voltage limit is defined by the silicon process's maximum allowed input voltage. The limiter begins de-Q'ing the external LC antenna when the input voltage exceeds $V_{DE\_Q}$, progressively de-Q'ing harder to ensure the antenna input voltage does not exceed the pin's maximum input voltage, and also to limit the voltage range acceptable to the internal AGC circuit.

MODULATION FET: Used to "short" the LC pin to LCCOM, for LF talk-back purposes. The modulation FET is activated when the AFE receives the "Clamp On" SPI command, and is deactivated when the AFE receives the "Clamp Off" SPI command.

ANTENNA TUNING: Each input channel has 63 pF (1 pF resolution) of tunable capacitance connected from the LC pin to LCCOM. The tunable capacitance may be used to fine-tune the resonant frequency of the external LC antenna.

VARIABLE ATTENUATOR: Attenuates the input signal voltage as controlled by the AGC amplifier. The purpose of the attenuation is to regulate the maximum signal voltage going into the demodulator.

PROGRAMMABLE ATTENUATOR: The programmable attenuator is controlled by the channel's configuration register sensitivity setting. The attenuator may be used to desensitize the channel from optimum desired signal wake-up.

AGC (Automatic Gain Control): AGC controls the variable attenuator to limit the maximum signal voltage into the demodulator. The signal levels from all 3 channels may be combined such that the AGC attenuates all 3 channels uniformly in respect to the channel with the strongest signal.

FGA (Fixed Gain Amplifiers): FGA1 and FGA2 may provide a two-stage gain of about 40 dB.

DETECTOR: The detector senses the incoming signal to wake-up the AFE. The output of the detector switches digitally at the signal carrier frequency. The carrier detector is shut off following wake-up if the demodulator output is selected.

DEMODULATOR: The demodulator consists of a full-wave rectifier, low pass filter, and peak detector that demodulates incoming amplitude modulation signals.

WAKE-UP FILTER: The wake-up filter enables the LFDATA output once the incoming signal meets the wake-up sequence requirements.

DATA SLICER: The data slicer compares the input with the reference voltage. The reference voltage comes from the modulation depth setting and peak voltage.

Referring now to both FIG. 3 and FIG. 4, the AFE 228 may have an internal 32 kHz oscillator. The oscillator may be used in several timers: inactivity timer, alarm timer, pulse width timer—wake-up filter high and low, and period timer—wake-up filter. The 32 kHz oscillator preferably is low power, and may comprise an adjustable resistor-capacitor (RC) oscillator circuit. Other types of low power oscillators may be used and are contemplated herein.

The inactivity timer may be used to automatically return the AFE 228 to standby mode by issuing a soft reset if there is no input signal before the inactivity timer expires. This is called "inactivity time out" or $T_{INACT}$. The inactivity timer may be used is to minimize AFE 238 current draw by automatically returning the AFE 228 to the lower current standby mode if a spurious signal wakes the AFE 228, doing so without waking the higher power draw external control device 224. The inactivity time may be reset when: receiving a low frequency (LF) signal, $\overline{\text{CS}}$ pin is low (any SPI command), or a timer-related soft reset. The inactivity time may start when there is no LF signal detected. The inactivity time may cause a AFE 228 soft reset when a previously received LF signal is absent for $T_{INACT}$. The soft reset may return the AFE 228 to standby mode where the AGC, demodulator, RC oscillator and such are powered-down. This may return the AFE 228 to the lower standby current mode.

The alarm timer may be used to notify the external control device 224 that the AFE 228 is receiving a LF signal that does not pass the wake-up filter requirement—keeping the AFE 228 in a higher than standby current draw state. The purpose of the alarm timer is to minimize the AFE 228 current draw by allowing the external control device 224 to determine whether the AFE 228 is in the continuous presence of a noise source, and take appropriate actions to "ignore" the noise source, perhaps lowering the channel's sensitivity, disabling the channel, etc. If the noise source is ignored, the AFE 228 may return to a lower standby current draw state. The alarm timer may be reset when: $\overline{\text{CS}}$ pin is low (any SPI command), alarm timer-related soft reset, wake-up filter disabled, LFDATA pin enabled (signal passed wake-up filter). The alarm timer may start when receiving a LF signal. The alarm timer may cause a low output on the $\overline{\text{ALERT}}$ pin when it receives an incorrect wake-up command, continuously or periodically, for about 32 milliseconds. This is called "Alarm Time-out" or $T_{ALARM}$. If the LF signal is periodic and contains an absence of signal for greater than $T_{INACT}$, the inactivity timer time out will result in a soft reset—no $\overline{\text{ALERT}}$ indication may be issued.

Figure 5:
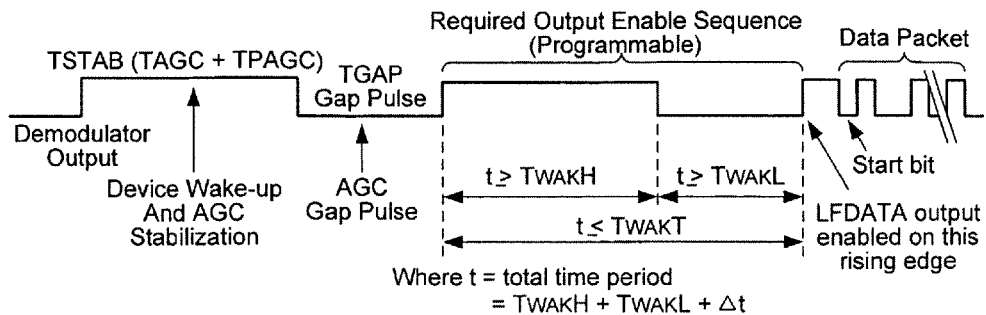
FIG. 5 is a schematic timing diagram of an exemplary wake-up sequence.
Figure 6:
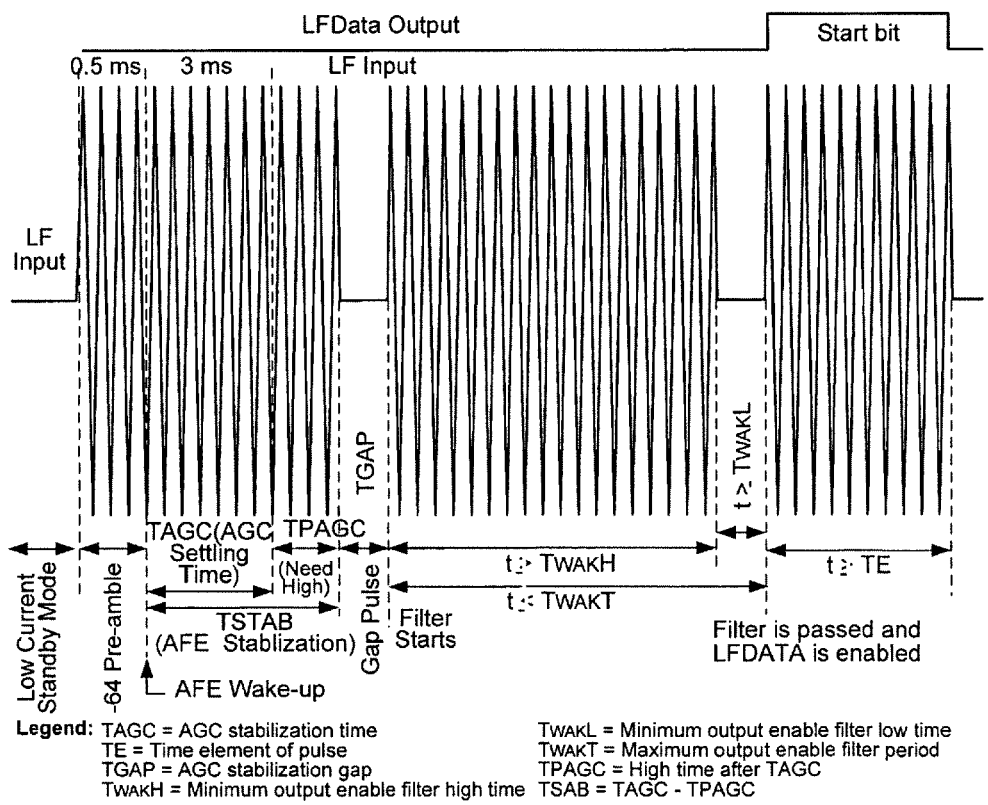
FIG. 6 is a schematic waveform diagram of the wake-up timing sequence shown in FIG. 5.

Referring to FIGS. 5 and 6, FIG. 5 depicts a schematic timing diagram of an exemplary wake-up sequence and FIG. 6 depicts a schematic waveform diagram of the exemplary wake-up timing sequence shown in FIG. 5. The pulse width (pulse time period) timer may be used to verify the received wake-up sequence meets both the minimum Wake-up High Time ($T_{WAKH}$) and minimum Wake-up Low Time ($T_{WAKL}$) requirements. The period timer may be used to verify the received wake-up sequence meets the maximum $T_{WAKT}$ requirement.

The configurable smart wake-up filter may be used to prevent the AFE 228 from waking up the external control device 224 due to unwanted input signals such as noise or incorrect base station commands. The LFDATA output is enabled and wakes the external control device 224 once a specific sequence of pulses on the LC input/detector circuit has been determined. The circuit compares a "header" (or called wake-up filter pattern) of the demodulated signal with a pre-configured pattern, and enables the demodulator output at the LFDATA pin when a match occurs. For example, The wake-up requirement consists of a minimum high duration of 100% LF signal (input envelope), followed by a minimum low duration of substantially zero percent of the LF signal. The selection of high and low duration times further implies a maximum time period. The requirement of wake-up high and low duration times may be determined by data stored in one of the configuration registers that may be programmed through the SPI interface. FIG. 7 is a table showing exemplary wake-up filter timing parameter selections that may be programmed into a configuration register so that each RKE transponder will wake-up. The wake-up filter may be enabled or disabled. If the wake-up filter is disabled, the AFE 228 outputs whatever it has demodulated. Preferably, the wake-up filter is enabled so that the external device or microcontroller unit 224 will not wake-up by an undesired input signal.

While timing the wake-up sequence, the demodulator output is compared to the predefined wake-up parameters. Where:

$T_{WAKH}$ is measured from the rising edge of the demodulator output to the first falling edge. The pulse width preferably falls within $T_{WAKH}=t=T_{WAKT}$.

$T_{WAKL}$ is measured from the falling edge of the demodulator output to the first rising edge. The pulse width preferably falls within $T_{WAKL}=t=T_{WAKT}$.

$T_{WAKT}$ is measured from rising edge to rising edge, i.e., the sum of $T_{WAKH}$ and $T_{WAKL}$. The pulse width of $T_{WAKH}$ and $T_{WAKL}$ preferably is $t=T_{WAKT}$.

The configurable smart wake-up filter may reset, thereby requiring a completely new successive wake-up high and low period to enable LFDATA output, under the following conditions.

The received wake-up high is not greater than the configured minimum $T_{WAKH}$ value.

The received wake-up low is not greater than the configured minimum $T_{WAKL}$ value.

The received wake-up sequence exceeds the maximum $T_{WAKT}$ value:

$$T_{WAKH}+T_{WAKL}>T_{WAKT}; \text{ or } T_{WAKH}>T_{WAKT}; \text{ or}$$

$$T_{WAKL}>T_{WAKT}$$

Soft Reset SPI command is received.

If the filter resets due to a long high ($T_{WAKH}>T_{WAKT}$), the high pulse timer may not begin timing again until after a low to high transition on the demodulator output.

Figure 8:
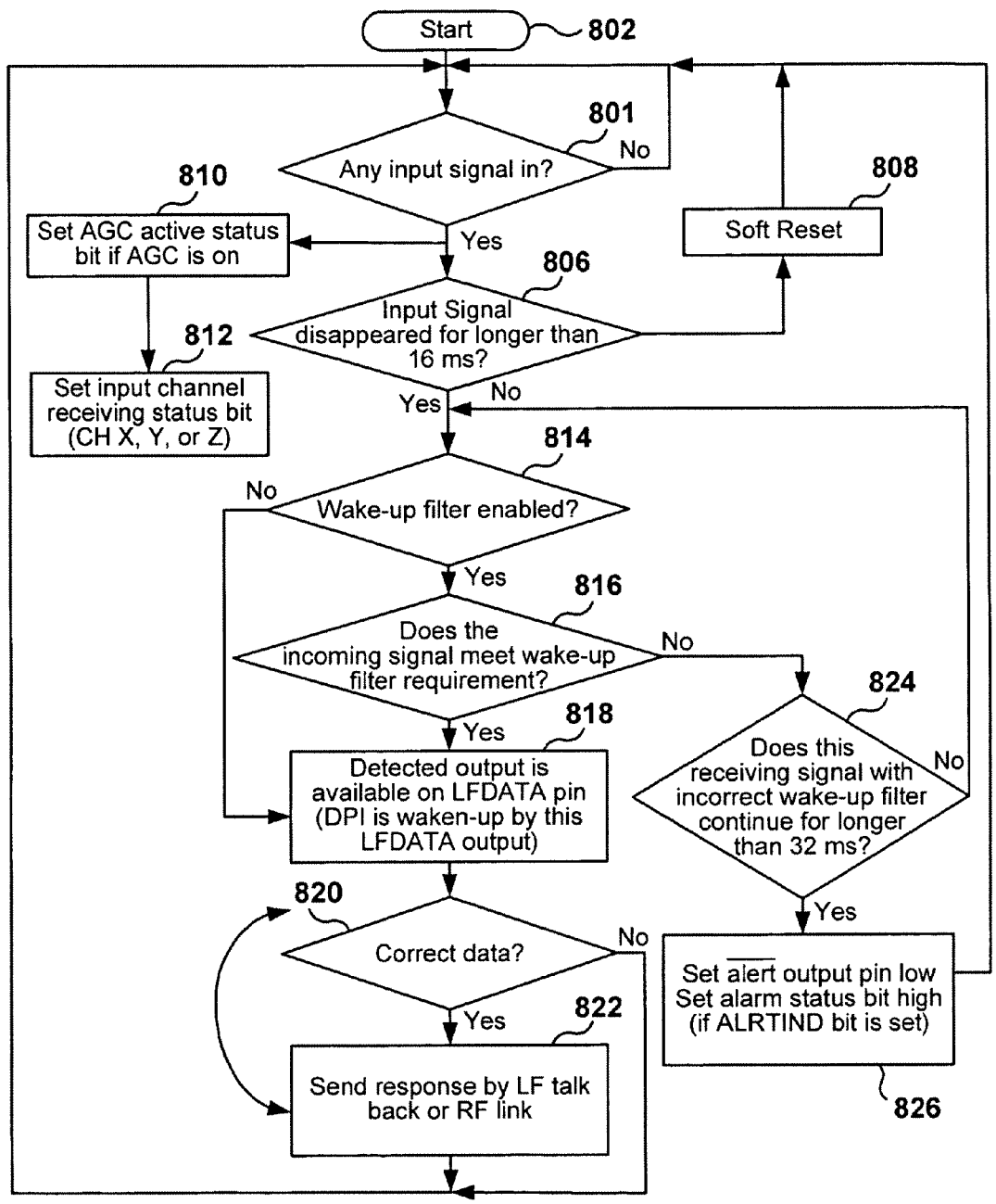
FIG. 8 is an exemplary flow diagram of determining whether a received signal meets the wake-up filter requirements.

Referring to FIG. 8, depicted is an exemplary flow diagram of determining whether a received signal meets the wake-up filter requirements. In step 802, the wake-up filter is in an inactive state. Step 804 checks for a LF input signal and when a LF input signal is present, step 810 sets the AGC active status bit if the AGC is on. The step 812 sets the input channel receiving status bit for channel X, Y and/or Z.

Step 806 checks if the LF input signal is absent for longer than 16 milliseconds. If so, step 808 will do a soft reset and return to step 804 to continue checking for the presence of a LF input signal.

In step 806, if the LF input signal is not absent for longer than 16 milliseconds then step 814 determines whether to enable the wake-up filter. If the wake-up filter is enabled in step 814, then step 816 determines whether the incoming LF signal meets the wake-up filter requirement. If so, step 818 makes the detected output available on the LFDATA pin and the external control device 224 is awakened by the LFDATA output. Step 820 determines whether the data from the LFDATA pin is correct and if so, in step 822 a response is send back via either the LF talk back or by a UHF radio frequency link.

Figure 9:
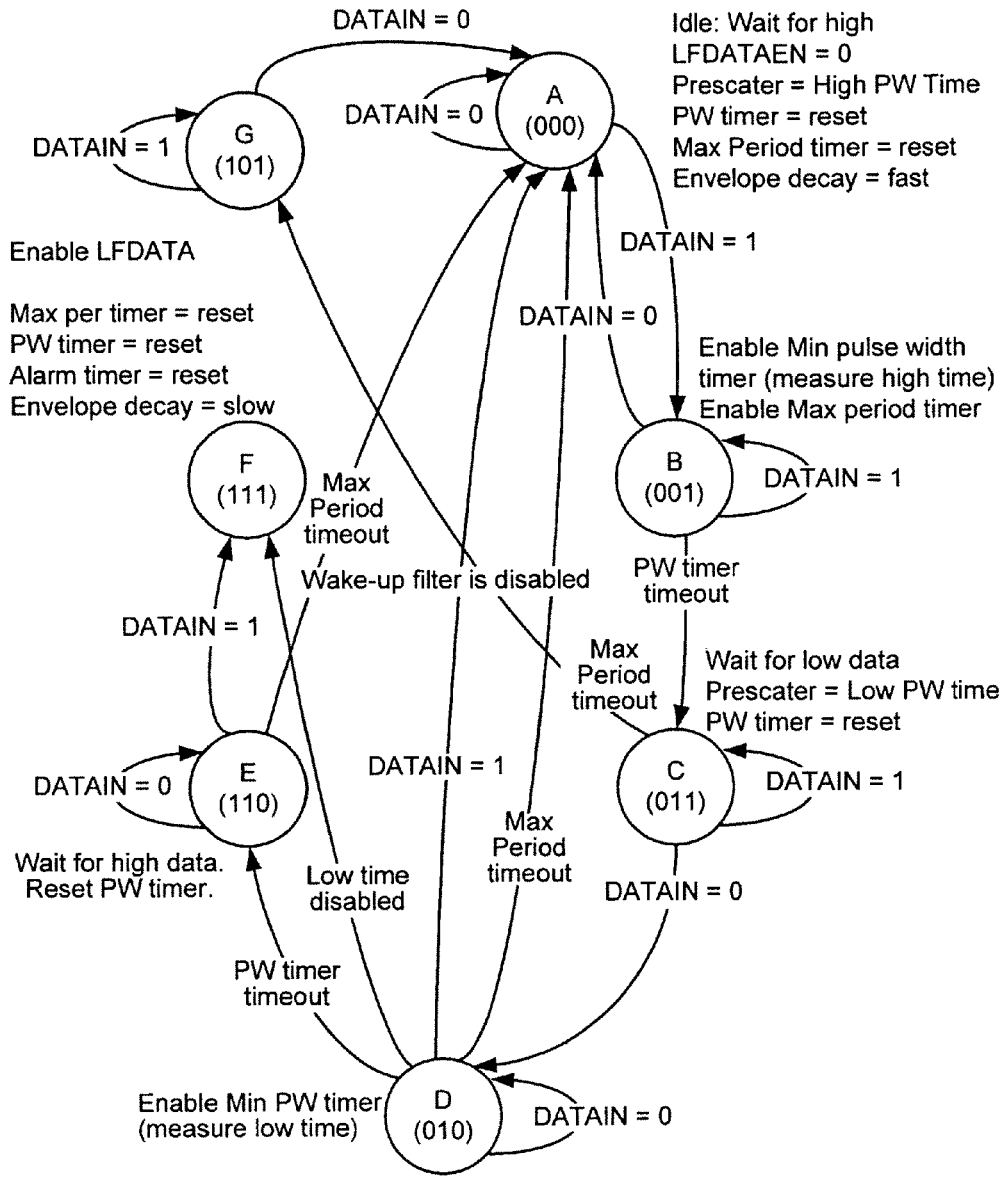
FIG. 9 is an exemplary state diagram for operation of the wake-up filter.

In step 816, if the incoming LF signal does not meet the wake-up filter requirement then step 824 determines whether the received incorrect wake-up command (or signal) continue for longer than 32 milliseconds. If not, then step 816 repeats determining whether the incoming LF signal meets the wake-up filter requirement. In step 824, if the received incorrect wake-up command continues for longer than 32 milliseconds then step 826 sets an alert output and step 816 continues to determine whether the incoming LF signal meets the wake-up filter requirement. Referring to FIG. 9, depicted is an exemplary state diagram for operation of the wake-up filter.

Referring back to FIG. 3, the AFE 228 may provide independent sensitivity control for each of the three channels. The sensitivity control may be adjusted at any time of operation by programming the AFE 228 configuration registers. Sensitivity control may set in a one of the configuration registers for each channel, and may provide a sensitivity reduction, for example, from about 0 dB to about −30 dB. Each channel may have its own sensitivity control from about 0 dB to about −30 dB by programming one of the configuration registers.

Each channel can be individually enabled or disabled by programming the configuration registers in the analog front-end device (AFE) 228. If the channel is enabled, all circuits in the channel become active. If the channel is disabled, all circuits in the disabled channel are inactive. Therefore, there is no output from the disabled channel. The disabled channel draws less battery current than the enabled channel does. Therefore, if one channel is enabled while other two channels are disabled, the device consumes less operating power than when more than one channel is enabled. There are conditions that the device may perform better or save unnecessary operating current by disabling a particular channel during operation rather than enabled. All three channels may be enabled in the default mode when the device is powered-up initially or from a power-on reset condition. The external device or microcontroller unit 224 may program the AFE 228 configuration registers to disable or enable individual channels if necessary any time during operation.

The AFE 228 may provide independent enable/disable configuration of any of the three channels. The input enable/disable control may be adjusted at any time for each channel, e.g., through firmware control of an external device. Current draw may be minimized by powering down as much circuitry as possible, e.g., disabling an inactive input channel. When an input channel is disabled, amplifiers, detector, full-wave rectifier, data slicer, comparator, and modulation FET of this channel may be disabled. Minimally, the RF input limiter should remain active to protect the silicon from excessive input voltages from the antenna.

Each antenna 220 may be independently tuned in steps of 1 pF, from about 0 pF to 63 pF. The tuning capacitance may be added to the external parallel LC antenna circuit.

The automatic gain controlled (AGC) amplifier may automatically amplify input signal voltage levels to an acceptable level for the demodulator. The AGC may be fast attack and slow release, thereby the AGC tracks the carrier signal level and not the amplitude modulated data bits on the carrier signal. The AGC amplifier preferably tracks the strongest of the three input signals at the antennas. The AGC power is turned off to minimize current draw when the SPI Soft Reset command is received or after an inactivity timer time out. Once powered on, the AGC amplifier requires a minimum stabilization time ($T_{STAB}$) upon receiving input signal to stabilize.

Figure 10:
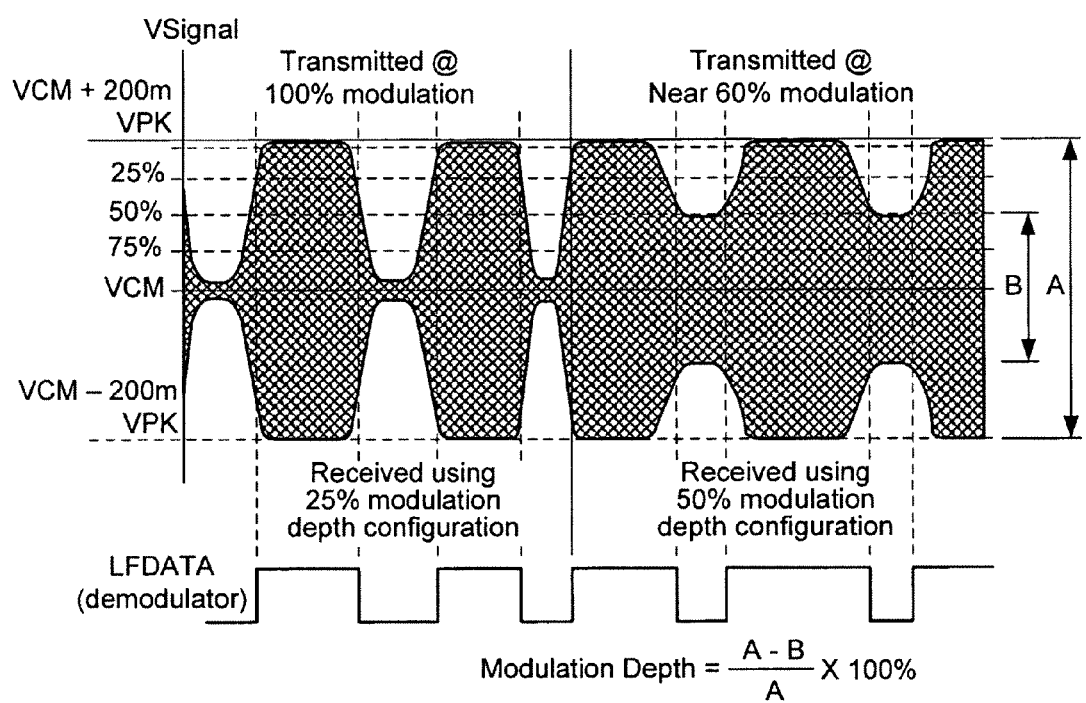
FIG. 10 is a schematic signal level diagram of modulation depth examples, according to the present invention.
Figure 11:
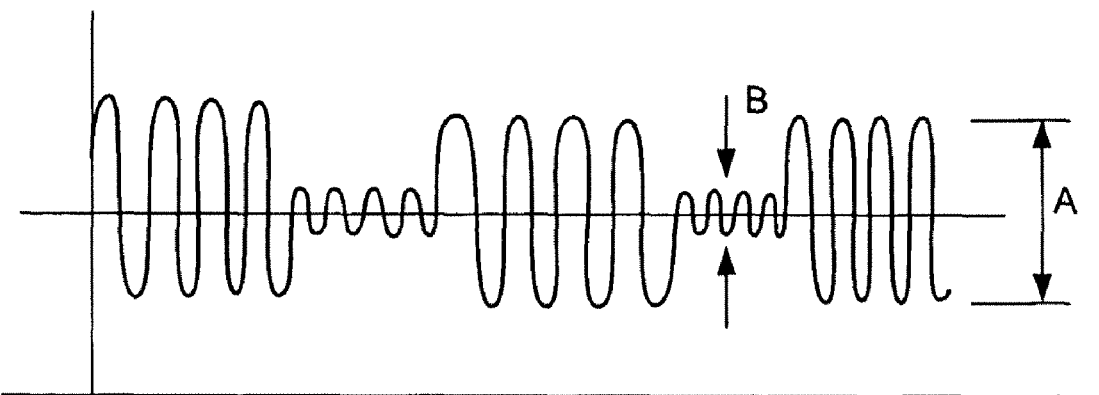
FIG. 11 is a table showing options for minimum modulation depth requirements and examples thereof.

Referring to FIG. 10, depicted is a schematic signal level diagram of modulation depth examples, according to the present invention. Configurable minimum modulation depth requirement for input signal defines what minimum percentage an incoming signal level must decrease from it's amplitude peak to be detected as a data low.

The AGC amplifier will attempt to regulate a channel's peak signal voltage into the data slicer to a desired $V_{AGCREG}$—reducing the input path's gain as the signal level attempts to increase above $V_{AGCREG}$, and allowing full amplification on signal levels below $V_{AGCREG}$.

The data slicer detects signal levels above $V_{THRESH}$, where $V_{THRESH} < V_{AGCREG}$. $V_{THRESH}$ effectively varies with the configured minimum modulation depth requirement configuration. If the minimum modulation depth requirement is configured to 50%, $V_{THRESH} = \frac{1}{2} V_{AGCREG}$, signal levels from 50% to 100% below the peak ($V_{AGCRFG}$) will be considered as data low.

Only when the signal level is of sufficient amplitude that the resulting amplified signal level into the data slicer meets or exceeds $V_{AGCREG}$, will the AFE 228 be able to guarantee the signal meets the minimum modulation depth requirement. The minimum modulation depth requirements are not met when signal levels into the data slicer exceed $V_{THRESH}$, but are less than $V_{AGCREG}$.

Figures 12, 13:
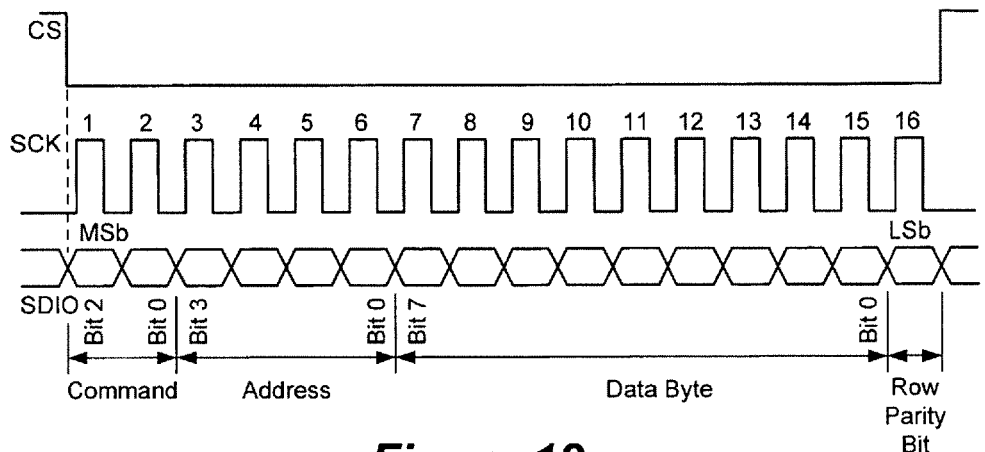
FIG. 12 is an exemplary SPI timing diagram.
FIG. 13 is an exemplary table showing the bit organization of the of configuration registers.

If the SSTR bit is set in the configuration register 5 as shown in FIG. 13, the demodulated output is inhibited unless the input level is greater than the AGC threshold level, which may be approximately about 15 millivolts peak-to-peak. This will produce detection of only signals have higher signal to noise ratios, resulting in less false wake-up, but at a loss in sensitivity determined by the minimum modulation depth requirement setting. The trade-off is between sensitivity and signal to noise ratio.

The present invention is capable of low current modes. The AFE 228 is in a low current sleep mode when, for example, the digital SPI interface sends a Sleep command to place the AFE 228 into an ultra low current mode. All but the minimum circuitry required to retain register memory and SPI capability will be powered down to minimize the AFE 228 current draw. Any command other than the Sleep command or Power-On Reset will wake the AFE 228. The AFE 228 is in low current standby mode when substantially no LF signal is present on the antenna inputs but the device is powered and ready to receive. The AFE 228 is in low-current operating mode when a LF signal is present on an LF antenna input and internal circuitry is switching with the received data.

The AFE 228 may utilize volatile registers to store configuration bytes. Preferably, the configuration registers require some form of error detection to ensure the current configuration is uncorrupted by electrical incident. The configuration registers default to known values after a Power-On-Reset. The configuration bytes may then be loaded as appropriate from the external control device 224 via the SPI digital interface. The configuration registers may retain their values typically down to 1.5V, less than the reset value of the external control device 224 and the Power-On-Reset threshold of the AFE 228. Preferably, the external control device 224 will reset on electrical incidents that could corrupt the configuration memory of the AFE 228. However, by implementing row and column parity that checks for corruption by an electrical incident of the AFE 228 configuration registers, will alert the external control device 224 so that corrective action may be taken. Each configuration byte may be protected by a row parity bit, calculated over the eight configuration bits.

The configuration memory map may also include a column parity byte, with each bit being calculated over the respective column of configuration bits. Parity may be odd (or even). The parity bit set/cleared makes an odd number of set bits, such that when a Power-On-Reset occurs and the configuration memory is clear, a parity error will be generated, indicating to the external control device 224 that the configuration has been altered and needs to be re-loaded. The AFE 228 may continuously check the row and column parity on the configuration memory map. If a parity error occurs, the AFE 228 may lower the $\overline{SCLK/ALERT}$ pin (interrupting the external control device 224) indicating the configuration memory has been corrupted/unloaded and needs to be reprogrammed. Parity errors do not interrupt the AFE 228 operation, but rather indicate that the contents in the configuration registers may be corrupted or parity bit is programmed incorrectly.

Antenna input protection may be used to prevent excessive voltage into the antenna inputs (LCX, LCY and LCZ of FIG. 3). RF limiter circuits at each LC input pin begin resistively de-Q'ing the attached external LC antenna when the input voltage exceeds the threshold voltage, $V_{DE\_Q}$. The limiter de-Q'es harder, proportional to an increasing input voltage, to ensure the pin does not exceed the maximum allowed silicon input voltage, $V_{LC}$, and also to limit an input signal to a range acceptable to the internal AGC amplifier.

LF talk back may be achieved by de-Q'ing the antenna 220 with a modulation field effect transistor (MOD FET) so as to modulate data onto the antenna voltage, induced from the base station/transponder reader (not shown). The modulation data may be from the external control device 224 via the digital SPI interface as "Clamp On," "Clamp Off" commands. The modulation circuit may comprise low resistive NMOS transistors that connect the three LC inputs to LCCOM. Preferably the MOD FET should turn on slowly (perhaps 100 ns ramp) to protect against potential high switching currents. When the modulation transistor turns on, its low turn-on resistance ($R_M$) damps the induced LC antenna voltage. The antenna voltage is minimized when the MOD FET turns-on and is maximized when the MOD FET turns-off. The MOD FET's low turn-on resistance ($R_M$) results in a high modulation depth.

Power-On-Reset (not shown) may remain in a reset state until a sufficient supply voltage is available. The power-on-reset releases when the supply voltage is sufficient for correct operation, nominally $V_{POR}$. The configuration registers may all be cleared on a Power-On-Reset. As the configuration registers are protected by row and column parity, the $\overline{ALERT}$ pin will be pulled down—indicating to the external control device 224 that the configuration register memory is cleared and requires loading.

The LFDATA digital output may be configured to either pass the demodulator output, the carrier clock input, or receiver signal strength indicator (RSSI) output. The demodulator output will normally be used as it consists of the modulated data bits, recovered from the amplitude modulated (AM) carrier envelope. The carrier clock output is available on the LFDATA pin if the carrier clock output is selected by the configuration setting. The carrier clock signal may be output at its raw speed or slowed down by a factor of four using the carrier clock divide-by configuration. Depending on the number of inputs simultaneously receiving signal and the phase difference between the signals, the resulting carrier clock output may not be a clean square wave representation of the carrier signal. If selected, the carrier clock output is enabled once the preamble counter is passed. When the LFDATA digital output is configured to output the signal at the demodulator input, this carrier clock representation may be output actual speed (divided by 1) or slowed down (divide by 4). If the Received Signal Strength Indicator (RSSI) is selected, the device outputs a current signal that is proportional to the input signal amplitude.

Referring to FIG. 12, depicted is an exemplary SPI timing diagram. The SPI interface may utilize three signals: active low Chip Select ($\overline{CS}$), clock (SCK) and serial data (SDIO). The SPI may be used may be used by the external control device 224 for writing to and reading from the configuration registers and controlling the circuits of the AFE 228.

Referring to FIG. 13, depicted is an exemplary table showing the bit organization of the configuration registers. As depicted each configuration register has nine bits, however, it is contemplated and within the scope of the invention that the configuration registers may have more or less than nine bits. Bit 0 of each register may be row parity for that register. All registers except register 7 may be readable and re-writable. Register 6 may be the column parity bit register, wherein each bit of the register 6 may be the parity bit of the combination of bits, arranged per column, of the corresponding registers. Register 7 may be a status register of circuit activities of the AFE 228, and may be read only. For example, the status register 7 may indicate which channel caused an output to wake-up the AFE 228, indication of AGC circuit activity, indication of whether the "Alert Output Low" is due to a parity error or noise alarm timer, etc.

FIG. 14 is an exemplary table of SPI commands to the AFE transponder circuits and configuration registers thereof.

The present invention has been described in terms of specific exemplary embodiments. In accordance with the present invention, the parameters for a system may be varied, typically with a design engineer specifying and selecting them for the desired application. Further, it is contemplated that other embodiments, which may be devised readily by persons of ordinary skill in the art based on the teachings set forth herein, may be within the scope of the invention, which is defined by the appended claims. The present invention may be modified and practiced in different but equivalent manners that will be apparent to those skilled in the art and having the benefit of the teachings set forth herein.

What is claimed is:

1. A method for waking up a remote keyless entry (RKE) transponder for further processing of incoming data on a signal, said method comprising the steps of:
   a) detecting a low frequency signal with an analog front-end (AFE) of a remote keyless entry (RKE) transponder;
   b) determining if the low frequency signal is being detected for at least a stabilization time period (Tstab), if so then continuing to step c), if not then waiting a time-out time period and thereafter returning to step a);
   c) determining if the low frequency signal is not being detected for a gap time period (Tgap), if so then continuing to step d), if not then waiting the time-out time period and thereafter returning to step a);
   d) determining if the low frequency signal is being detected for at least a high time period (TwakH), if so then continuing to step e) and if not then returning to step a);
   e) determining if the low frequency signal is not being detected for at least a low time period (TwakL), if so then continuing to step f) and if not then returning to step a) wherein the low time period (TwakL) and the high time period (TwakH) are set by programming a configuration register
   f) determining if the detection of the low frequency signal in step d) and no detection of the low frequency signal in step e) occur within a total time period (TwakT), if so then continuing to step g) and if not then returning to step a);
   g) waking up logic circuits of the RKE transponder for processing of data from the low frequency signal and after processing of the data then returning to step a),
   wherein the data is transmitted using amplitude modulation of the low frequency signal and the data is transmitted after step e).

2. The method according to claim 1, wherein the total time period (TwakT) is digitally programmable.

3. The method according to claim 2, wherein the total time period (TwakT) is greater than the sum of the high time period (TwakH) and the low time period (TwakL).

4. The method according to claim 1, wherein the step of waking up the logic circuits of the RKE transponder further comprises the step of waking-up an external control device for accepting data from the received low frequency signal.

5. The method according to claim 4, wherein the external control device is selected from the group consisting of digital processor, microcontroller, microprocessor, digital signal processor, application specific integrated circuit (ASIC) and programmable logic array (PLA).

6. The method according to claim 1, further comprising the steps of storing the high time period (TwakH), the low time period (TwakL) and the total time period (TwakT) in at least one digital configuration register in the AFE.

7. The method according to claim 6, wherein the steps of storing the high time period (TwakH), the low time period (TwakL) and the total time period (TwakT) in the at least one digital configuration register are done with an external control device by using serial interface communication (SPI) commands.

8. The method according to claim 1, wherein the step of detecting the low frequency signal further comprises the steps of detecting the low frequency signal with a plurality of remote keyless entry (RKE) transponders, each of the plurality of RKE transponders having an analog front-end (AFE) that comprises a wake-up filter, wherein each of the wake-up filters uses a different high time period (TwakH) so that only one of the plurality of RKE transponders will wake-up during reception of the low frequency signal.

9. The method according to claim 1, wherein the step of detecting the low frequency signal further comprises the steps of detecting the low frequency signal with a plurality of remote keyless entry (RKE) transponders, each of the plurality of RKE transponders having an analog front-end (AFE) that comprises a wake-up filter, wherein each of the wake-up filters uses a different low time period (TwakL) so that only one of the plurality of RKE transponders will wake-up during reception of the low frequency signal.

10. The method according to claim 1, wherein the RKE transponder further comprises a plurality of analog front-ends (AFEs) for receiving the signal.

11. The method according to claim 10, wherein the plurality of AFEs comprise three low frequency signal input channels.

12. The method according to claim 1, wherein the received low frequency signal is at a frequency from about 100 kHz to about 400 kHz.

13. The method according to claim 1, wherein the received low frequency signal is at a frequency of about 125 kHz.

14. A remote keyless entry (RKE) transponder having selective wake-up comprising:
   an analog front-end (AFE) for receiving a low frequency signal;
   logic circuits coupled to the AFE, wherein the logic circuits process data from the received low frequency signal, wherein the low frequency signal is amplitude modulated for encoding data to be transmitted to the AFE, the logic circuits having a low power mode and an operational mode; and a wake-up filter within the AFE and coupled to the logic circuits, wherein the wake-up filter determines from the received low frequency signal whether to cause the logic circuits to go from the low power mode to the operational mode, whereby when the logic circuits are in the operational mode the data from the received low frequency signal is processed;

at least one digital configuration register for individually setting a high time period (TwakH) and a low time period (TwakL);

the wake-up filter in determining whether to cause the logic circuits to change from the low power mode to the operational mode is operable to:

a) detect the low frequency signal;
b) determine if the low frequency signal is being detected for at least a stabilization time period (Tstab), if so then continue to c), if not then wait a time-out time period and thereafter return to a);
c) determine if the low frequency signal is not being detected for a gap time period (Tgap), if so then continue to d), if not then wait the time-out time period and thereafter return to a);
d) determine if the low frequency signal is being detected for at least a high time period (TwakH), if so then continue to e) and if not return to a);
e) determine if the low frequency signal is not being detected for at least a low time period (TwakL), if so then continue to f) and if not return to a);
f) determine if the detection of the low frequency signal in d) and no detection of the low frequency signal in e) occur within a total time period (TwakT), if so then continue to g) and if not return to a);
g) cause the logic circuits to change from the low power mode to the operational mode so as to process the data from the low frequency signal, after processing of the data the logic circuits to return to the low power mode and then to return to a), wherein the data is transmitted after step e).

15. The RKE transponder according to claim 14, wherein the AFE comprises a low frequency signal amplifier and an amplitude modulation signal detector.

16. The RKE transponder according to claim 14, wherein the total time period (TwakT) is set to be higher that the sum of the high time period (TwakH) and the low time period (TwakL).

17. The RKE transponder according to claim 14, wherein the at least one digital configuration register furthermore stores the total time period (TwakT).

18. The RKE transponder according to claim 17, wherein the RKE transponder further comprises an external control device for programming the high time period (TwakH), the low time period (TwakL) and the total time period (TwakT) into the at least one digital configuration register.

19. The RKE transponder according to claim 17, wherein the external control device is selected from the group consisting of digital processor, microcontroller, microprocessor, digital signal processor, application specific integrated circuit (ASIC) and programmable logic array (PLA).

20. The RKE transponder according to claim 14, wherein the RKE transponder has at least one AFE for receiving the low frequency signal.

21. The RKE transponder according to claim 20, wherein the at least one AFE comprises three low frequency signal input channels.

22. The RKE transponder according to claim 20, wherein the AFE receives low frequency signals at about 125 kHz.

23. The RKE transponder according to claim 20, wherein the AFE is adapted to receive low frequency signals from about 100 kHz to about 400 kHz.

24. The method according to claim 1, wherein the time-out time period is about 32 milliseconds.

25. The method according to claim 1, further comprising the step of generating an alarm signal if the conditions of steps d)-f) are not met for minimizing power required by the RKE transponder.

26. The method according to claim 25, wherein the step of generating the alarm signal causes the RKE transponder to ignore a noise source.

27. The method according to claim 26, wherein the noise source is ignored by reducing sensitivity of a radio frequency input receiving the noise source.

28. The method according to claim 26, wherein the noise source is ignored by disabling a radio frequency input receiving the noise source.

29. The RKE transponder according to claim 14, comprising an alarm timer which is started if the low frequency signal is not being detected for the gap time period (TGAP).

30. The RKE transponder according to claim 29, further comprising generation of an alarm signal to alert the RKE transponder to minimize its power consumption if the conditions of d)-f) are not met within a predefined time period.

31. The method according to claim 30, wherein the alarm signal causes the RKE transponder to ignore a noise source during the time-out time period.

32. The method according to claim 31, wherein the noise source is ignored by reducing sensitivity of a radio frequency input of the RKE transponder receiving the noise source.

33. The method according to claim 31, wherein the noise source is ignored by disabling a radio frequency input of the RKE transponder receiving the noise source.

34. The method according to claim 30, wherein the predefined time period is about 32 ms.

* * * * *